United States Patent
Stewart et al.

(10) Patent No.: US 6,379,214 B1
(45) Date of Patent: Apr. 30, 2002

(54) APPARATUS AND METHODS FOR Z-AXIS CONTROL AND COLLISION DETECTION AND RECOVERY FOR WATERJET CUTTING SYSTEMS

(75) Inventors: Jonathan M. Stewart, Seattle, WA (US); Thomas Pesek, Griesheim; Volker Kern, Zornheim, both of (DE); Chien Chou Wu, Hsin Chu (TW); Daniel Chin, Seattle; Felice M. Sciulli, Issaquah, both of WA (US)

(73) Assignee: Flow International Corporation, Kent, WA (US)

( * ) Notice: Subject to any disclaimer, the term of this patent is extended or adjusted under 35 U.S.C. 154(b) by 0 days.

(21) Appl. No.: 09/382,554

(22) Filed: Aug. 25, 1999

(51) Int. Cl.$^7$ .............................. B24C 1/00; B26D 7/00
(52) U.S. Cl. ...................... 451/2; 451/3; 451/5; 451/10; 451/24; 451/38; 83/22; 83/66; 83/73; 83/177
(58) Field of Search ................................ 451/2, 3, 8, 9, 451/10, 24, 38, 102; 83/22, 63, 66, 67, 73, 177

(56) References Cited

U.S. PATENT DOCUMENTS

| | | | |
|---|---|---|---|
| 3,823,928 A | 7/1974 | Stolin et al. | 266/23 M |
| 3,829,622 A | 8/1974 | Elliot | 179/100.3 V |
| 3,894,180 A | 7/1975 | Canino | 178/6.6 R |

(List continued on next page.)

FOREIGN PATENT DOCUMENTS

| | | |
|---|---|---|
| DE | 94 19 477.7 | 2/1995 |
| EP | 0 417 024 A1 | 3/1991 |
| FR | 2 699 852 A1 | 7/1994 |
| JP | 9-207051 A * | 8/1997 |
| WO | WO 98/17439 | 4/1998 |

OTHER PUBLICATIONS

Derwent Abstract: High Pressure Water Jet Cutter–has a cutter head fitted to a carrier which has a sensor element to stop collisions.*

(List continued on next page.)

Primary Examiner—M. Rachuba
(74) Attorney, Agent, or Firm—Seed Intellectual Property Law Group PLLC

(57) ABSTRACT

This invention relates to apparatus and methods for z-axis control and collision detection and recovery for waterjet and abrasive-jet cutting systems. In one embodiment, an apparatus includes a linear rail, a slide member coupleable to a cutting head and slideably coupled to the linear rail, at least one actuator having a first end coupled to the slide member and a second end fixed with respect to the linear rail, a position sensor, and a controller. The actuator provides an adjustable support force that supports the weight of the cutting head, allowing the cutting head to be controllably positioned at a desired height above the workpiece. The actuator may include a pneumatic cylinder, or alternately, a linear motor. In another aspect, an apparatus includes a first mount member coupleable to a controllably positionable mounting surface of the waterjet cutting system, a second mount member coupleable to the cutting head and disengageably coupled to the first mount member, and a sensing circuit having a plurality of first conductive elements disposed on the first mount member and a plurality of second conductive elements disposed on the second mount member. In the event of a collision between the cutting head and an obstruction, the second mount member disengages from the first mount member to prevent breakage of the cutting head. Following the collision, the second mount member is quickly and easily re-engaged with the first mount member without time-consuming re-calibration. In one embodiment, re-engagement of the second end first mount members is automatically performed by a biasing member.

13 Claims, 10 Drawing Sheets

U.S. PATENT DOCUMENTS

| | | | |
|---|---|---|---|
| 3,978,748 A | | 9/1976 | Leslie et al. .................... 83/53 |
| 4,006,294 A | | 2/1977 | Canino ....................... 358/127 |
| 4,675,492 A | * | 6/1987 | Yokomichi et al. ...... 219/69.12 |
| 4,814,574 A | * | 3/1989 | Babel et al. ............. 219/69.19 |
| 4,848,042 A | | 7/1989 | Smith et al. ................... 51/410 |
| 4,975,557 A | * | 12/1990 | Yamada et al. .......... 219/69.12 |
| 4,987,822 A | | 1/1991 | Stoll ........................ 91/358 R |
| 5,128,505 A | * | 7/1992 | Matter ..................... 219/69.12 |
| 5,204,598 A | * | 4/1993 | Torii et al. ............... 318/568.1 |
| 5,643,058 A | | 7/1997 | Erichsen et al. .............. 451/99 |
| 5,782,673 A | * | 7/1998 | Warehime ...................... 451/2 |
| 6,077,152 A | * | 6/2000 | Warehime .................... 451/75 |

OTHER PUBLICATIONS

Renishaw, PLC, *Renishaw—the innovative touch*; Registered number 1106260, England, http://www.renishaw.com/index.html; 2 pages; printed Aug. 20, 1999.

The University of California at Berkeley, *Technology/Business Opportunity non–Confidentia Disclosure*, "Micropositioning Apparatus Using Linear Force Actuator," U.S. Patent No. 5,323,012, http://otl.berkeley.edu/UCB91016.html, 3 pages, printed Aug. 22, 1999.

* cited by examiner

APPARATUS AND METHODS FOR Z-AXIS CONTROL AND COLLISION DETECTION AND RECOVERY FOR WATERJET CUTTING SYSTEMS

TECHNICAL FIELD

This invention relates to apparatus and methods for z-axis control and collision detection and recovery for waterjet and abrasive-jet cutting systems.

BACKGROUND OF THE INVENTION

Waterjet and abrasive-jet cutting systems are used for cutting a wide variety of materials. In a typical waterjet cutting system, a high-pressure fluid (e.g., water) flows through a cutting head having a cutting nozzle that directs a cutting jet onto a workpiece. The cutting nozzle may include a mixing tube for introducing an abrasive into the high-pressure cutting jet to form an abrasive cutting jet. The cutting nozzle may then be controllably moved across the workpiece to cut the workpiece into the desired shape. After the cutting jet (or abrasive cutting jet) passes through the workpiece, the energy of the cutting jet is dissipated and the fluid is collected in a catcher tank for disposal. Waterjet and abrasive jet cutting systems of this type are shown and described, for example, in U.S. Pat. No. 5,643,058 issued to Erichsen et al. and assigned to Flow International Corp. of Kent, Wash., which patent is incorporated herein by reference. The '058 patent corresponds to Flow International's Paser 3 abrasive cutting systems.

FIG. 1 is an isometric view of a waterjet cutting system 10 in accordance with the prior art. The waterjet cutting system 10 includes a cutting head 20 coupled to a mount assembly 30. The mount assembly 30 is controllably driven by a control gantry 40 having a drive assembly 42 that controllably positions the cutting head 20 throughout an x-y plane that is substantially parallel to a surface 14 of a workpiece 12. Typically, the drive assembly 42 may include a pair of ball-screw drives oriented along the x and y axes and a pair of electric drive motors. Alternately, the drive assembly 42 may include a five axis motion system. Two-axis and five-axis control gantries are commercially-available as the Bengal 4x4 cutting systems from low International of Kent, Washington.

FIG. 2 is a partial-elevational side view of the cutting head 20 and the mount assembly 30 of the waterjet cutting system 100 of FIG. 1. The cutting head 20 includes a high-pressure fluid inlet 22 coupled to a high-pressure fluid source 50, such as a high-pressure or ultra-high pressure pump, by a high-pressure line 23. In this embodiment, the cutting head 20 includes a nozzle body 24 and a mixing tube 26 terminating in a jet exit port 28. Although the term "mixing tube" is commonly used to refer to that portion of the cutting head of an abrasive jet cutting system in which abrasive is mixed with a high-pressure fluid jet to form an abrasive cutting jet, in the following discussion, "mixing tube" is used to refer to that portion of the cutting head 20 that is closest to the workpiece 12, regardless of whether the waterjet cutting system uses an abrasive or non-abrasive cutting jet.

The mount assembly 30 includes a mounting arm 32 having a mounting aperture 34 disposed therethrough. The mounting arm 32 is coupled to a lower portion 44 of the control gantry 40. The nozzle body 24 of the cutting head 20 is secured within the mounting aperture 34 of the mounting arm 32.

In operation, high-pressure fluid from the high-pressure fluid source 50 enters the high-pressure fluid inlet 22, travels through the nozzle body 24 and mixing tube 26, and exits from the jet exit port 28 toward the workpiece 12 as a cutting jet 16. The cutting jet 16 pierces the workpiece 12 and performs the desired cutting. Using the control gantry 40, the cutting head 20 is traversed across the workpiece 12 in the desired direction or pattern.

To maximize the efficiency and quality of the cut, a standoff distance d (FIG. 2) between the jet exit port 28 of the mixing tube 26 and the surface 14 of the workpiece 12 must be carefully controlled. If the standoff distance d is to close, the mixing tube 26 can plug during piercing, causing system shutdown and possibly a damaged workpiece 12. If the distance is too far, the quality and accuracy of the cut suffers.

The mixing tube at 26 is typically fabricated of specially formulated wear-resistant carbides to reduce wear. Particularly for abrasive cutting systems, the mixing tube 26 suffers extreme wear due to its constant contact with high velocity abrasives. Thus, mixing tubes are a relatively expensive component of the cutting head 20. The specially formulated carbides are also quite brittle, and can easily break if the mixing tube 26 collides with an obstruction during operation of the cutting system 10, such as fixturing or cut-out portions of the workpiece 12 which have been kicked up during the cutting operation. Accidental breakage of the mixing tube 26 increases operational costs and downtime of the cutting system 10.

Current collision sensors use a ring sensor disposed about the mixing tube 26 which slides along or slightly above the surface 14 of the workpiece 12. The ring sensor indicates the relative height of the workpiece. A motorized ball-screw drives the cutting head up and down to maintain the required standoff distance. When the ring collides with a kicked-up part or other obstruction, a detector detects the collision and sends a stop signal to the control gantry to stop the movement of the mixing tube in an attempt to avoid the collision.

A fundamental problem with such collision sensors is that they must have a large enough "safety buffer" between the sensor and a mixing tube to allow the control gantry enough time to stop without damaging the mixing tube. Due to the size and speed of modem cutting systems, the task of stopping the control gantry quickly to avoid a collision is quite difficult. Another problem is that any shifting of the components requires a lengthy re-calibration routine to insure proper standoff distance d. A serious collision can ruin the ring sensor.

One approach has been to simply make the ring larger the allow to control gantry more room to stop. This approach, however, prevents the cutting jet 16 from cutting near obstructions and fixtures commonly found around the edges of the workpiece 12, thereby wasting material. Enlarging the ring also increases the occurrence of erroneous collision signals which results in unnecessary downtime of the cutting system. Finally, existing ring sensor devices are expensive and are not robust in detecting surface height or collisions when operating the control gantry at high-speed or under dirty conditions.

SUMMARY OF THE INVENTION

This invention relates to apparatus and methods for z-axis control and collision detection and recovery for waterjet and abrasive-jet cutting systems. In one aspect of the invention, an apparatus includes a linear rail, a slide member coupleable to the cutting head and slideably coupled to the linear rail, at least one actuator having a first end coupled to the slide member and a second end fixed with respect to the linear rail, a position sensor coupled to the slide member, and a controller. The actuator provides an adjustable support force that supports the weight of the cutting head, allowing the cutting head to be controllably positioned at a desired height above the workpiece. The actuator may include a pneumatic cylinder, or alternately, a linear motor.

In another aspect, an apparatus according to the invention includes a first mount member coupleable to a controllably positionable mounting surface of the waterjet cutting system, a second mount member coupleable to the cutting head and disengageably coupled to the first mount member, and a sensing circuit having a plurality of first conductive elements disposed on the first mount member and a plurality of second conductive elements disposed on the second mount member. In the event of a collision between the cutting head and an obstruction, the second mount member disengages from the first mount member to prevent breakage of the cutting head. Following the collision, the second mount member is quickly and easily re-engaged with the first mount member without time-consuming re-calibration. In one embodiment, re-engagement of the second and first mount members is automatically performed by a biasing member.

In another aspect, a method of controlling a height of a cutting head of a waterjet cutting system over a surface of a workpiece includes coupling a first end of a contact member to the cutting head, engaging a second end of the contact member with the surface of the workpiece, providing an adjustably controllable support force to support a weight of the cutting head, and slightly reducing the support force to slightly downwardly bias the contact member into engagement with the surface of the workpiece. The position control method advantageously provides a simple height measurement system and also allows for automatic adjustment for changes in friction or weight of various components of the waterjet cutting system.

BRIEF DESCRIPTIVE DRAWINGS

DETAILED DESCRIPTION OF THE INVENTION

The present disclosure is directed toward apparatus and methods for z-axis control and collision detection and recovery of cutting heads of waterjet cutting systems. Specific details of certain embodiments of the invention are set forth in the following description, and in FIGS. 3–9 to provide a thorough understanding of such embodiments. A person of ordinary skill in the art, however, will understand that the resent invention may have additional embodiments, and that the invention may be practiced without several of the details described in the following description.

Figure 1:
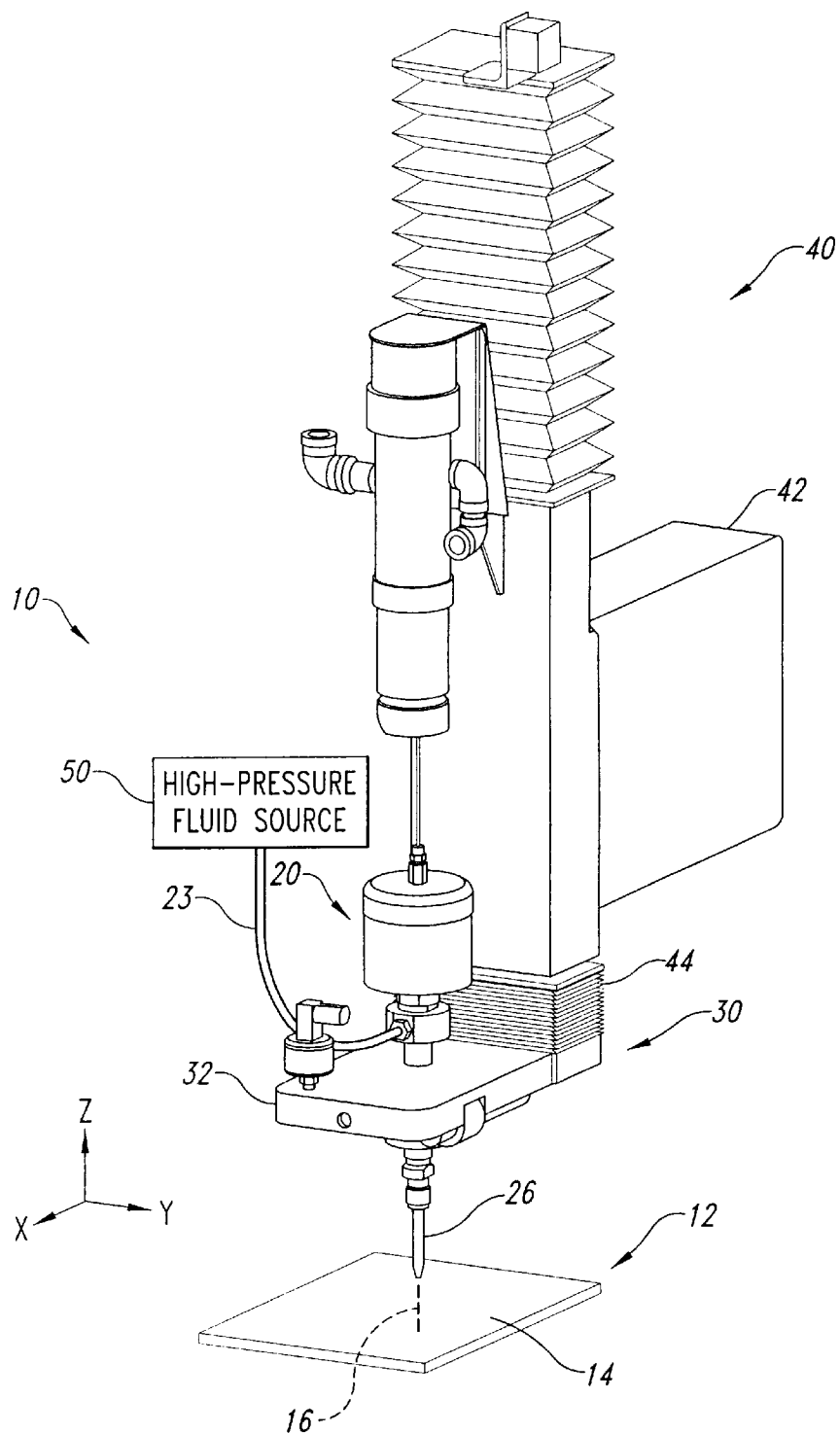
FIG. 1 is an isometric view of a waterjet cutting system in accordance with the prior art.
Figure 2:
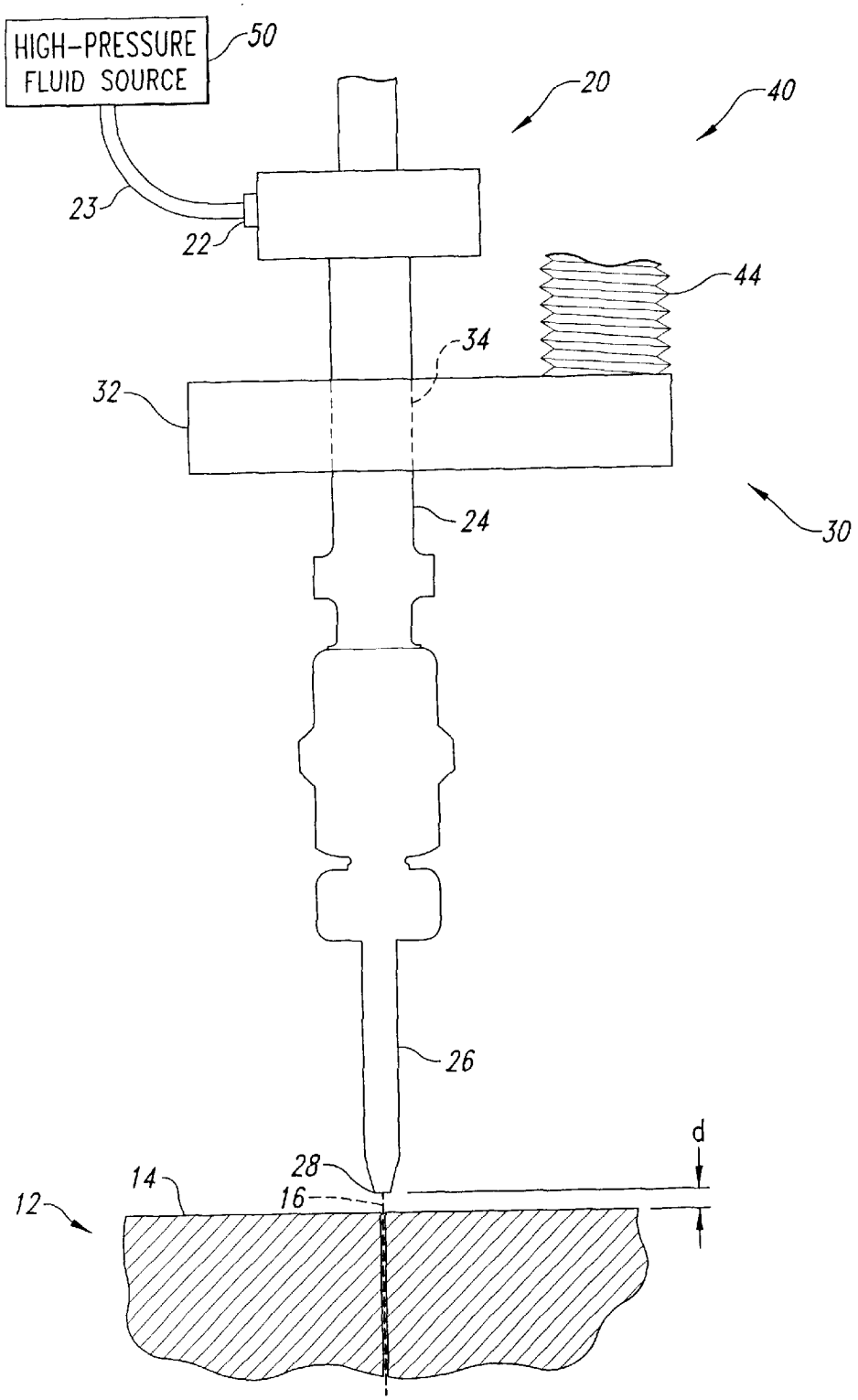
FIG. 2 is a Me partial-elevational view of a cutting head and a mount assembly of the waterjet, cutting system of FIG. 1.
Figure 3:
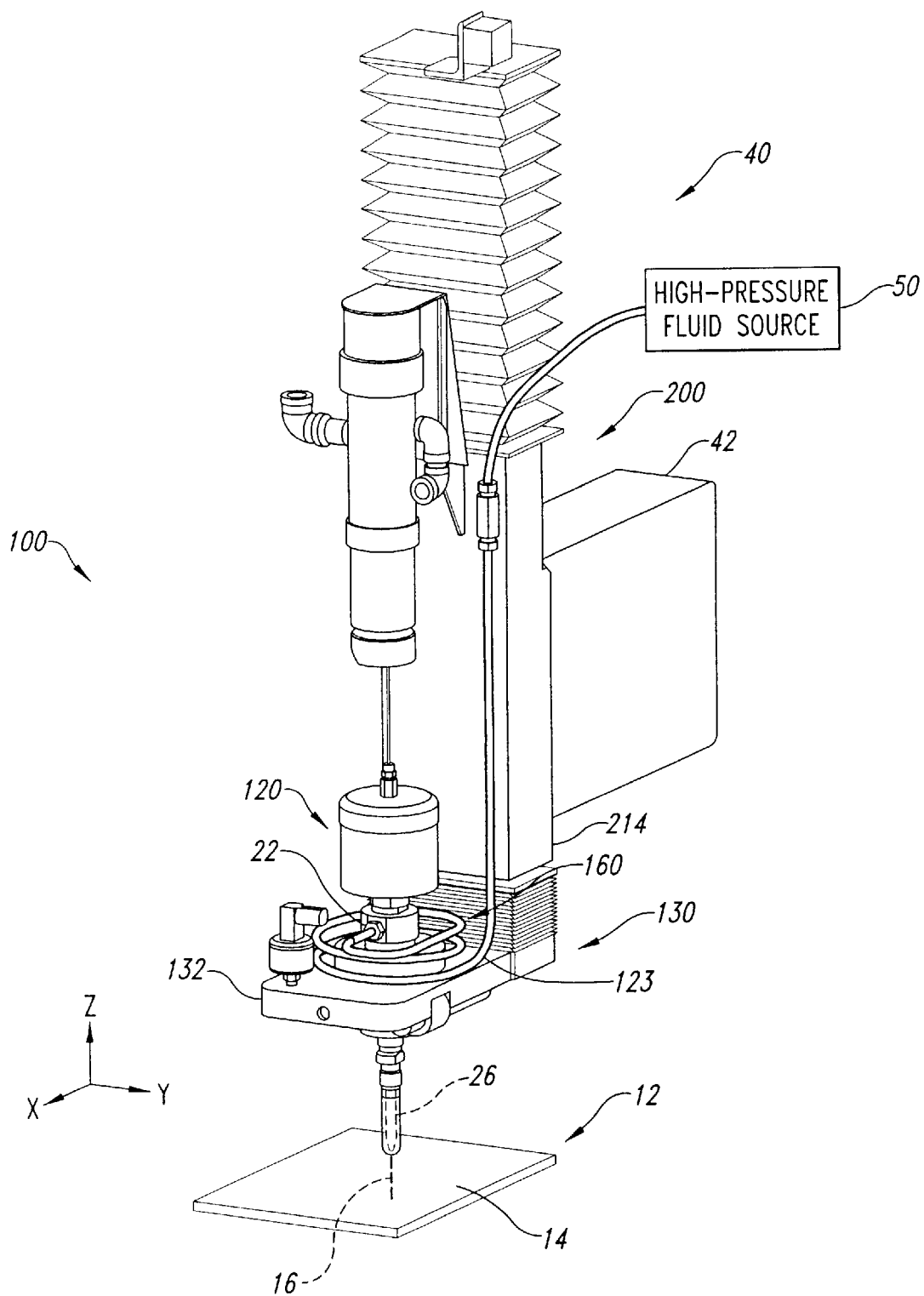
FIG. 3 is a front isometric view of a waterjet cutting system in accordance with an embodiment of the invention.

FIG. 3 is an isometric view of a waterjet cutting system 100 in accordance with an embodiment of the invention. The waterjet cutting system 100 includes a cutting head 120 coupled to a disengageable (or "breakaway") mounting assembly 160. In the event of a collision, the disengageable mounting assembly 160 advantageously disengages (or "breaks") to prevent breakage of the mixing tube 26 or other cutting head components. After the collision occurs and the waterjet cutting system 100 has been stopped, the disengageable mounting assembly 160 may be easily re-engaged and the cutting operation continued without lengthy re-calibration procedures.

The waterjet cutting system 100 also includes a high-pressure fluid source 50 fluidly coupled to the cutting head 120 by a coiled high-pressure line 123. The disengageable mounting system 160 is attached to a mounting arm 132, the mounting arm being coupled to a control gantry 40 as described above. The high-pressure fluid source 50 may, for example, be a high-pressure or ultra-high pressure pump, such as the commercially-available Husky pump models available from Flow International of Kent, Wash.

Figure 4:
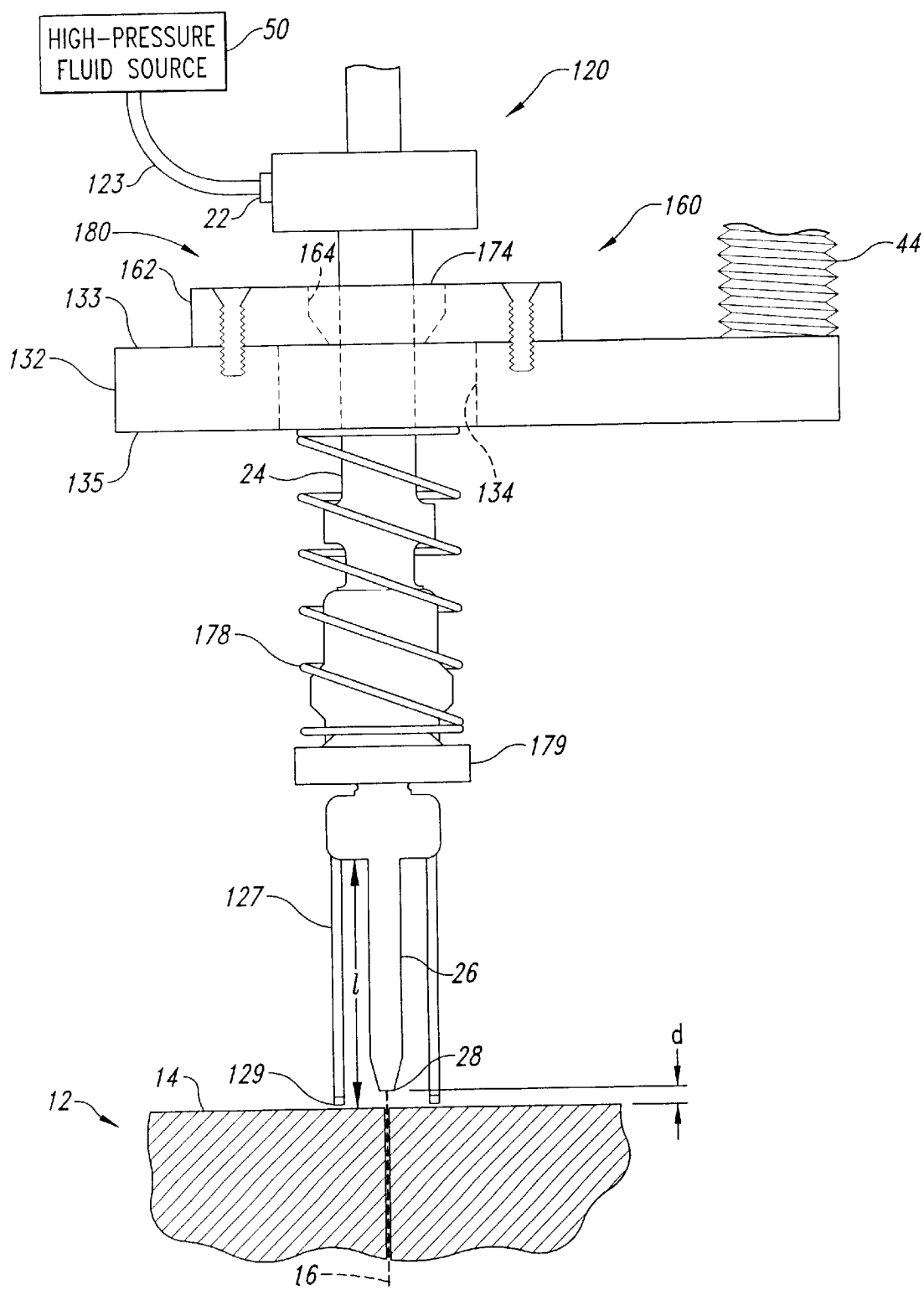
FIG. 4 is a partial-sectional side view of a cutting head and a disengageable mount assembly of the waterjet cutting system of FIG. 3.
Figure 5:
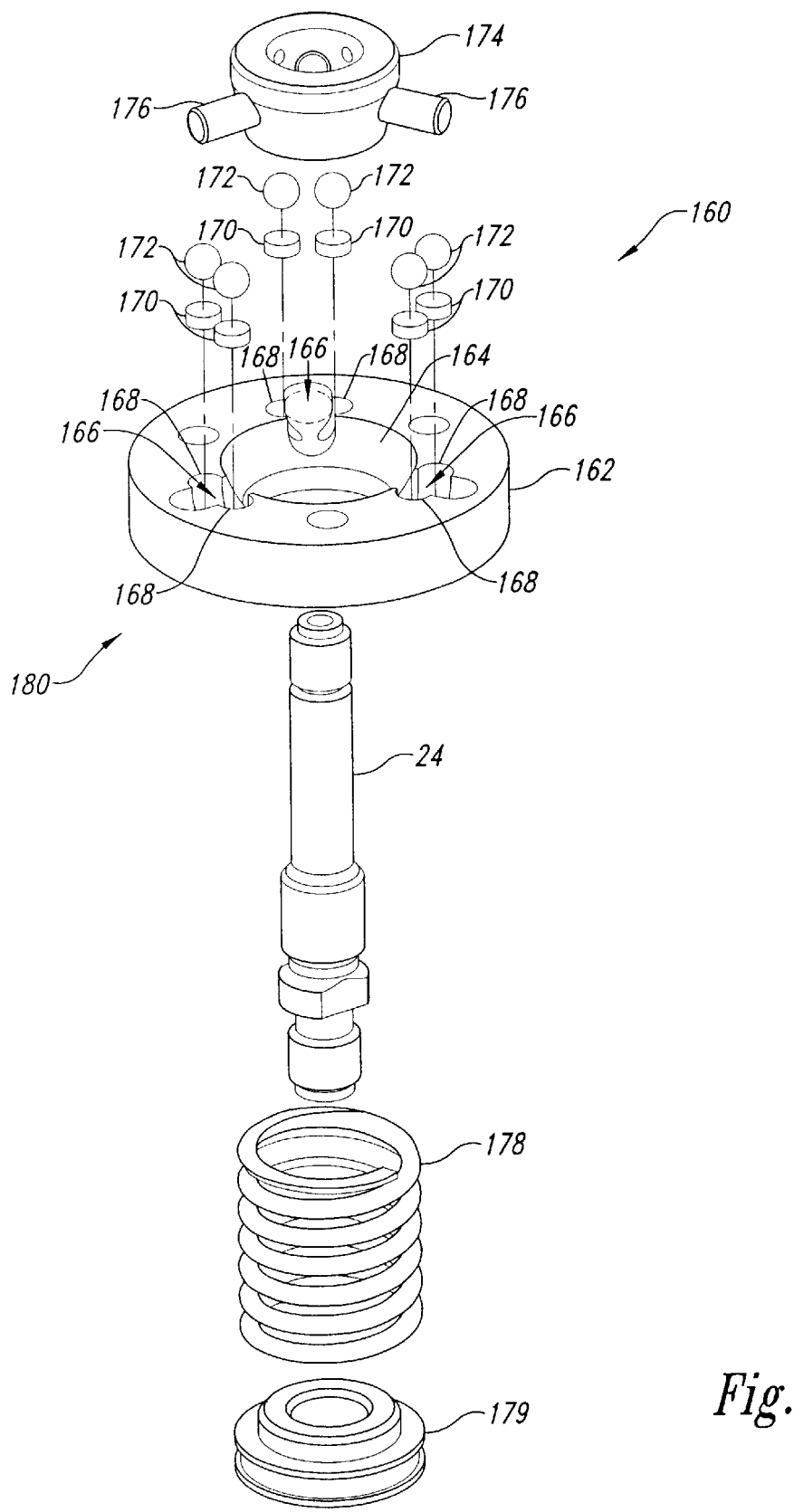
FIG. 5 is an exploded isometric view of the disengageable mount assembly of FIG. 4.

FIG. 4 is a partial-sectional side view of the cutting head 120 and the disengageable mount assembly 160 of the waterjet cutting system 100 of FIG. 3. FIG. 5 is an exploded isometric view of the disengageable mount assembly 160 of FIG. 4. As shown in FIG. 4, the cutting head 120 includes a high-pressure fluid inlet 22 coupled to the coiled high-pressure line 123, a nozzle body 24 and a mixing tube 26. The mixing tube 26 includes a jet exit port 28 out of which a cutting jet 16 emanates toward a workpiece 12. A collision shield 127 is disposed about the mixing tube 26 to shield the mixing tube 26 from collisions. The collision shield 127 includes a wear ring 129. In some modes of operation of the waterjet cutting system 100, as described more fully below, the wear ring 129 engages a surface 14 of the workpiece 12, while in other modes of operation the wear ring 129 is positioned slightly above the surface 14. The wear ring 129 may be formed of the same material as the collision shield 127, or alternately, may be formed of a low-friction material, such as, for example, Teflon®. The collision shield 127 has a length I that is sized to provide a constant, desired standoff distance d between the jet exit port 28 and the surface 14.

The disengageable mounting assembly 160 includes a retainer 162 attached to an upper surface 133 of the mounting arm 132. The mounting arm 132 has an enlarged mounting aperture 134 disposed therethrough. The retainer 162 includes a seating aperture 164 that is aligned with the enlarged mounting aperture 134 of the mounting arm 132. As best seen in FIG. 5, the retainer 162 further includes three pin cavities 166 disposed about the circumference of the seating aperture 164. Each pin cavity 166 has a pair of rounded pockets 168 disposed on opposite sides of each cavity. An electrically-conductive strike pad 170 is positioned at the bottom of each rounded pocket 168. Similarly, an electrically-conductive ball 172 is positioned within each rounded pocket 168 in contact with the associated strike pad 170.

A clamping collar 174 is attached to the nozzle body 24 of the cutting head 120 and is partially disposed within the seating aperture 164. Three conductive pins 176 project from the clamping collar 174. With the clamping collar 174 seated in the seating aperture 164, the conductive pins 176 projecting to the pin cavities 166 and contact the conductive balls 172. The disengageable mounting assembly 160 also includes a seating force spring 178 disposed about the nozzle body 24 and engaged against a lower surface 135 of the mounting arm 132. A tensioner 179 is engaged onto the nozzle body 24 (e.g., threadedly engaged) and partially compresses the seating force spring 178. A collision sensing circuit 180 is formed on the retainer 162, as described more fully below.

Figure 6:
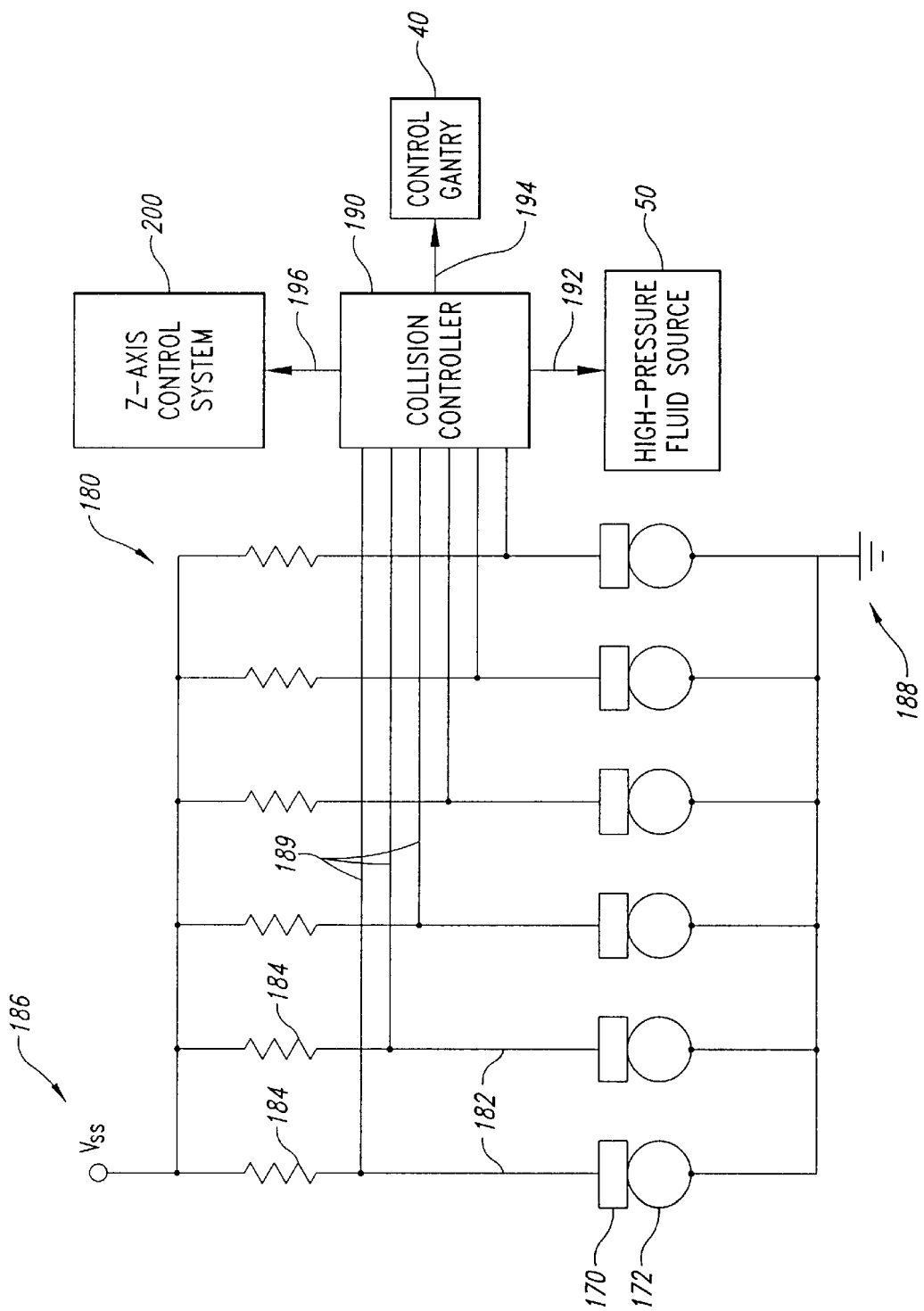
FIG. 6 is a schematic view of a collision sensing circuit of the disengageable mount assembly of FIG. 5.

FIG. 6 is a schematic view of the collision sensing circuit 180 of the disengageable mount assembly 160 of FIG. 5. The collision sensing circuit 180 includes a plurality of conductive elements 182 coupled to the strike pads 170 and to resistors 184 in parallel fashion. A voltage source 186 is electrically coupled to the resistors 184. The strike pads 170 are electrical contact with the conductive balls 172 which are coupled by additional conductive elements 182 to ground 188. Each resistor 184, strike pads 170, and conductive ball 172 form a branch of the parallel circuit. Secondary conductive elements 189 are electrically coupled to a collision controller 190 and to the conductive elements 182 between the resistors 24 and the strike pads 170. The collision controller 190 transmits a first collision detection signal 192 to the high-pressure fluid source 50. The collision controller 190 also transmits of second collision detection signal 194 to the control gantry 40 and a third collision detection signal 196 to a z-axis control assembly 200, described more fully below.

The disengageable mounting assembly embodiment 160 shown in FIGS. 5 and 6 is known as a Kelvin clamp. Kelvin clamps have been employed in touch probes and other precision instrumentation, such as the coordinate measurement machines (CMM's) sold by Renishaw PLC of Gloucestershire, UK, as shown and described at www.renishaw.uk.com.

In operation, the disengageable mount assembly 160 prevents breakage of the mixing tube 26 by disengaging in the event of collision. As the control gantry 40 moves the cutting head 120 in the x-y plane substantially parallel to the surface 14 of the workpiece 12, the wear ring 129 moves across the surface 14. In this embodiment, the collision shield 127 is disposed about the mixing tube 26. When the collision shield 127 strikes an obstruction, the force of the collision exerts a torque on the nozzle body 24 of the cutting head 120. The nozzle body 24 begins to swing within the enlarged mounting aperture 134 of the mounting arm 132, causing the clamping collar 174 to rotate within the seating aperture 164. The collision force required to pivot the nozzle body 24 is determined by the amount of compression force into seating force spring 178, which is adjusted by adjusting the position of the tensioner 179.

As the clamping collar 174 rotates, one or more of the conductive pins 176 become disengaged from the associated conductive balls 172, thereby breaking the circuit in one or more of the branches of the collision sensing circuit 180. The collision controller 190 monitors the branches of the collision sensing circuit 180 via the second conductive leads 189, and detects the occurrence of the collision. The collision controller 190 then transmits the first collision detection signal 192 to the high-pressure fluid source 50 to shut off the flow of high-pressure fluid through the cutting head 160. The collision controller 190 also transmits the second collision detection signal 194 to the control gantry 40 to stop movement of the cutting head 160. Finally, the collision controller 190 transmits the third collision detection signal 196 to the z-axis control system 200. Alternately, for an abrasive jet cutting systems, the collision controller 190 may also transmit a fourth collision detection signal to shutoff a flow of abrasive to the cutting head 120.

After the waterjet cutting system 100 has been shut down by the collision controller 190, the collision shield 127 is disengaged from the obstruction, and the disengageable mount assembly 160 is simply re-engaged by re-seating the clamping collar 174 within the seating aperture 164, and re-seating the conductive pins 176 within the pin cavities 166. In this embodiment, the clamping collar 174 is automatically re-seated within the seating aperture 164 by the force of the seating force spring 178. In alternate embodiments, the clamping collar 174 may be manually re-seated within the seating aperture 164. After the conductive pins 176 have been re-seated, the branches of the sensing circuit 180 are re-established. The cutting head 120 may be repositioned by the control gantry 40, and a cutting operation may be quickly and easily resumed.

The disengageable mount assembly 160 advantageously prevents breakage of the mixing tube 26 and other components of the cutting head 120 in the event of a collision. When a collision occurs, the cutting head 120 simply pivots out of the way. At the same time, collision detection signals are generated which cause the various subsystems to stop automatically. The disengageable mount assembly 160 allows the cutting head 120 to be returned to its pre-collision state with excellent repeatability, preserving the machines calibration and allowing the user to resume cutting without any re-homing operations. Following a collision, the mount assembly 160 may be quickly re-engaged and the cutting operation resumed without re-calibration or other time-consuming procedures.

One may note that although the disengageable mount assembly 160 has been shown in the figures and described in the foregoing discussion as being a Kelvin clamp, other disengageable mount assemblies are conceivable which may perform the function of pivoting the cutting head 120 out of the way in the event of a collision. Thus, while prior art collision sensing systems focused on attempting to avoid a collision, the apparatus and method of the present invention acknowledges that a collision may be unavoidable, and accommodates the collision by means of the disengageable mount assembly.

Figure 7:
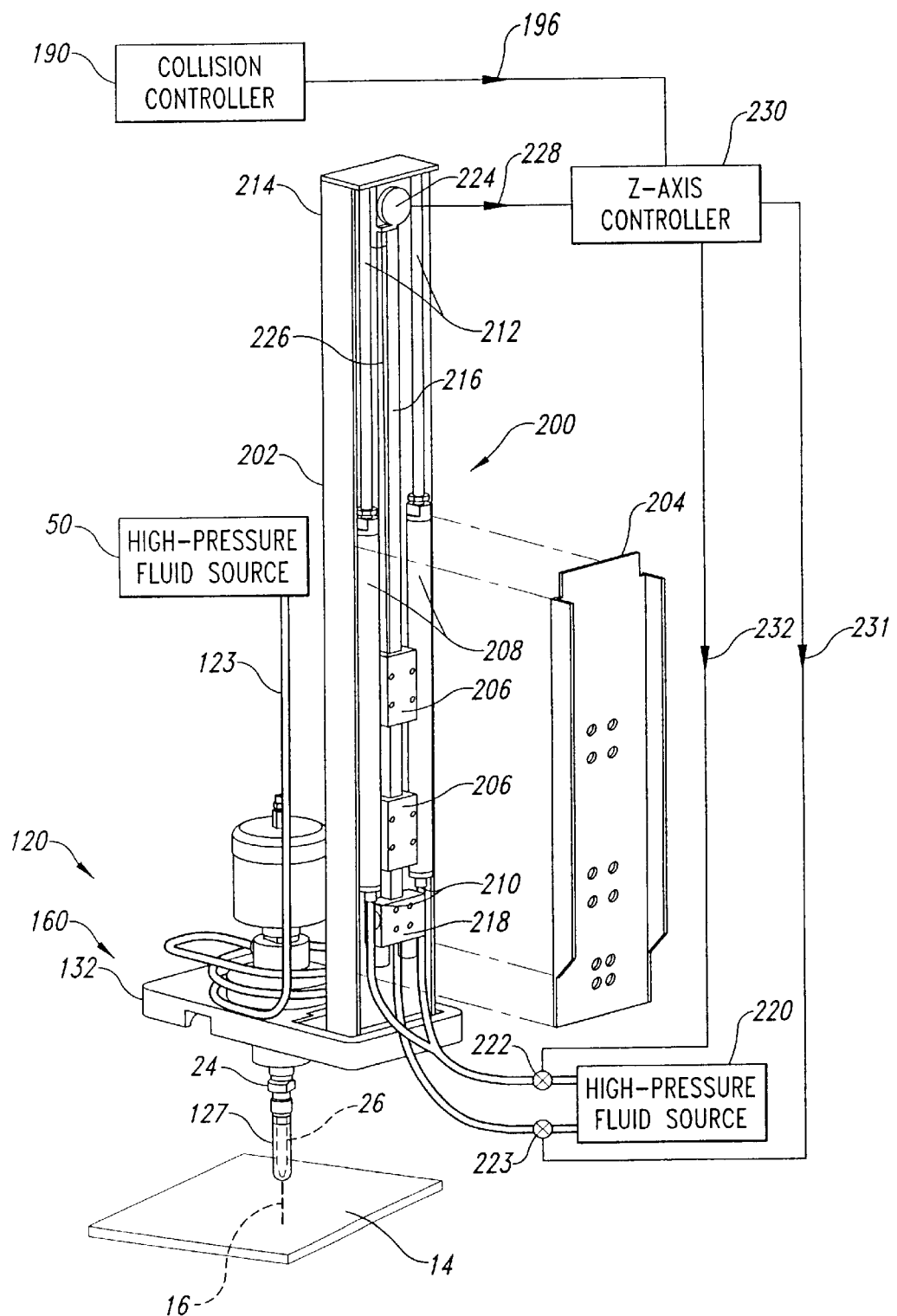
FIG. 7 is a partially-exploded back isometric view of the waterjet cutting system of FIG. 3

FIG. 7 is a partially-exploded back isometric view of the waterjet cutting system 100 of FIG. 3. As shown in this view, the waterjet cutting system 100 includes a z-axis control system 200 disposed within a housing section 202. A back plate 204 is coupled to a pair of guide blocks 206 to enclose a backside of the housing section 202, and is coupled to the control gantry 40. Thus, the z-axis control system 200 is controllably positioned by the control gantry 40 along with the cutting head 120.

The z-axis control system 200 further includes a pair of air cylinders 208, each air cylinder having a first end 210 fixedly attached to the housing section 202 and a second end 212 attached to a slide member 214. The mounting arm 132 is attached to the slide member 214. A linear rail 216 is coupled to the slide member 214 and is disposed between the air cylinders 208. The linear rail 216 slideably engages the pair of guide blocks 206. An air brake 218 is attached to the slide member 214 and slideably engages the linear rail 216. The air cylinders 208 and the air brake 218 are fluidly coupled to a high-pressure air source 220. An first air control valve 222 controls to flow from the high-pressure air source 220 to the air cylinders 208, and a second air control valve 223 controls airflow to the air brake 218. The air brake 218 is preferably a "pressure to release" pneumatic brake that keeps the slide member 214 in position and prevents the slide member 214 (and cutting head 120) from falling in the event of a loss of air pressure.

A position sensor 224 is attached to the slide member 214 between the second ends 212 of the air cylinders 208. In this embodiment, the position sensor 224 includes a cable 226 attached to the uppermost guide block 206. One commercially-available position sensor suitable for this purpose, for example, is the LX-PA-15 String Potentiometer sold by Unimeasure, Inc. of Corvallis, Oreg. A z-axis controller 230 is electrically coupled to the position sensor 224, to the first and second air control valves 222, 223, and to the collision controller 190.

In operation, the z-axis control system 200 supports the weight of the cutting head 120, and rapidly raises and lowers the cutting head 120 by controlling the air pressure within the air cylinders 208. Thus, the air cylinders 208 provide a constant upward bias force that supports the weight of the cutting head 120, reducing the tracing force of the collision shield 127 on the workpiece 12. If a collision is detected by the collision controller 190, the collision controller 190 transmits the third collision detection signal 196 to the z-axis controller 230. The z-axis controller 230 transmits a brake control signal 231 to the second air control valve 223, thereby releasing the air brake 218, and also transmits an air control signal 232 to the first air control valve 222, increasing the air pressure within the air cylinders 208 and raising the slide member 214. One may note that the functions of the z-axis controller 230 and the collision controller 190 may be integrated into a single controller.

As the slide member 214 moves upwardly, the cable 226 is pulled out of the position sensor 224. The position sensor 224 determines the amount cable 226 drawn out by the movement of the slide member 214 and transmits a position signal 228 to the z-axis controller 230. In response to the position signal 228, the z-axis controller 230 transmits an air control signal 232 to the air control valve 222 to raise or lower above air pressure within the air cylinders 208.

It is understood that the actuation device of the z-axis control system 200 may be varied from the particular embodiment shown in FIG. 7 and described above. For example, rather than a pair of air cylinders 208, a single air cylinder may be employed. Alternately, the one or more air cylinders 208 may be replaced by linear motors. Commercially-available linear motors suitable for this purpose include, for example, those sold by Trilogy Systems of Webster, Tex. Generally, however, the air cylinders 208 are less expensive than alternate actuation devices. Commercially-available air cylinders suitable for this purpose include, for example, the Airpel® 16 m Air Cylinders sold by the Airport Corporation of Norwalk, Conn.

One advantage of the z-axis control system 200 is that it allows a unique mode of operation of the waterjet cutting system 100, referred to herein as "biased following." Using the biased following method, the cutting head 120 is engaged with the surface 14 of the workpiece 12. The height of the workpiece 12 is therefore measurable simply by measuring the position of the cutting head 120. Without the z-axis control system 200, however, the relatively large weight of the cutting head 120 would cause undue and acceptable loading on the workpiece 12, preventing the method of biased following from being used. The z-axis control system 200 advantageously provides a constant upward bias force that accommodates some or all of the way to the cutting head 120, thereby greatly reducing or eliminating the tracing force on the workpiece 12, allowing the method of biased following to be successfully used.

Another advantage of the z-axis control system 200 is that the cutting head 120 may be raised rapidly. Prior art ballscrew drive systems typically are capable of raising or lowering the cutting head at a rate of approximately 40 cm/min. Using linear actuation devices, the z-axis control system 200 is capable of raising or lowering the cutting head at a rate of approximately 40 cm/sec. Thus, the inventive z-axis control system is approximately 60 times faster than prior art drive systems.

The z-axis control system 200 has five basic modes of operation: (1) a biased following (or height sensing) cutting mode, (2) a set-height cutting mode, (3) a manual raise/lower mode, (4) a park mode, and (5) a calibration mode. The calibration mode is used to test the performance of the z-axis control system 200 or to set up the system for the first time. In brief, the pressure within the air cylinders is varied until a neutral pressure is found. The neutral pressure is the pressure at which the cutting head 120 and the slide member 214 and other components (collectively referred to as "the axis") will not move up or down with the air brake released. The upper and lower limits of a neutral pressure "dead band" are found and recorded. Also, the upper and lower travel limits of the axis are found and recorded. These data are used to set the values for the other movement modes, and the "dead band" data are used as a diagnostic tool to determine if the axis is in need of servicing due to excessive friction.

Figure 8A:
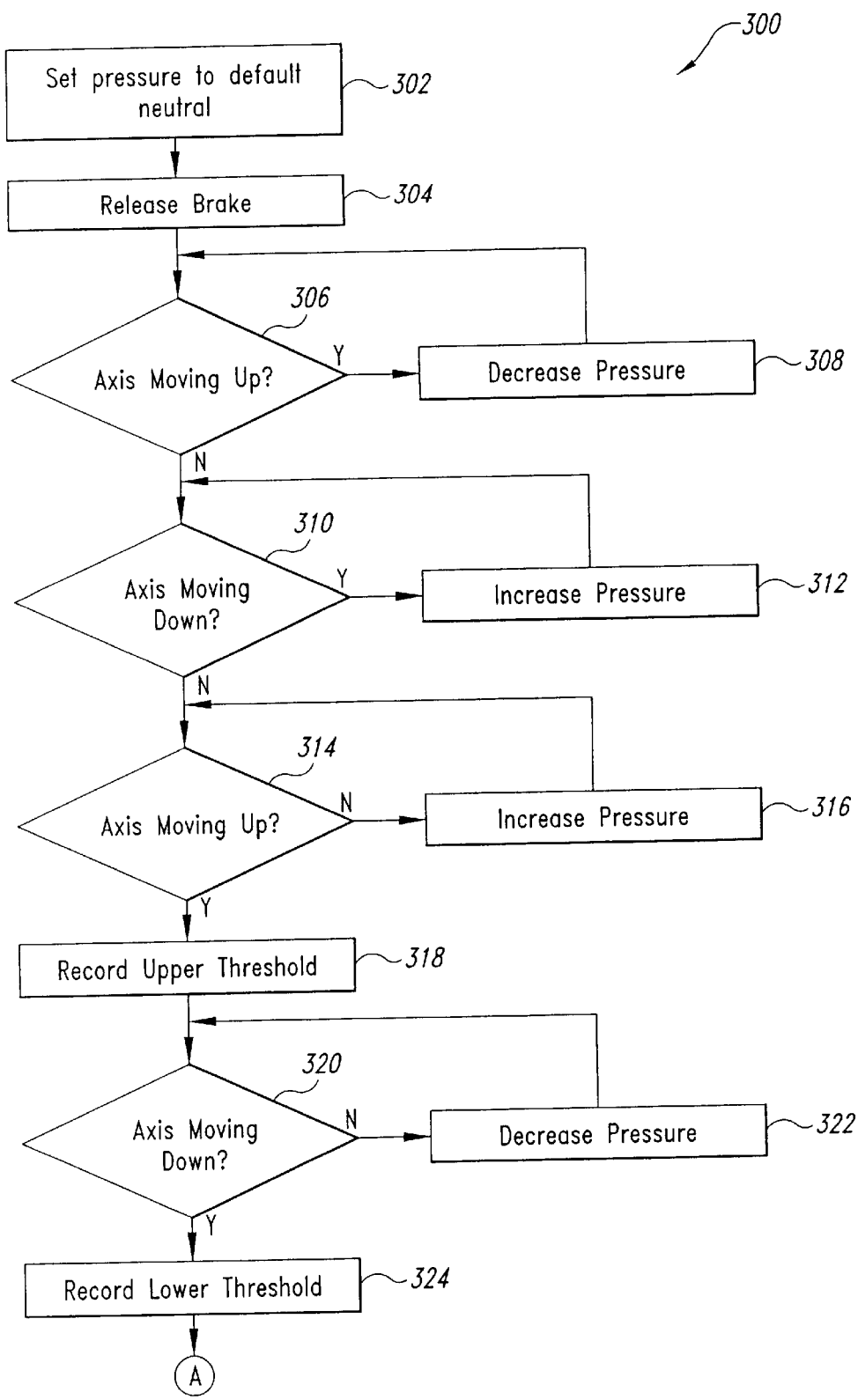
FIG. 8 is a flowchart representation of a calibration routine of a z-axis control system in accordance with an embodiment of the invention.
Figure 8B:
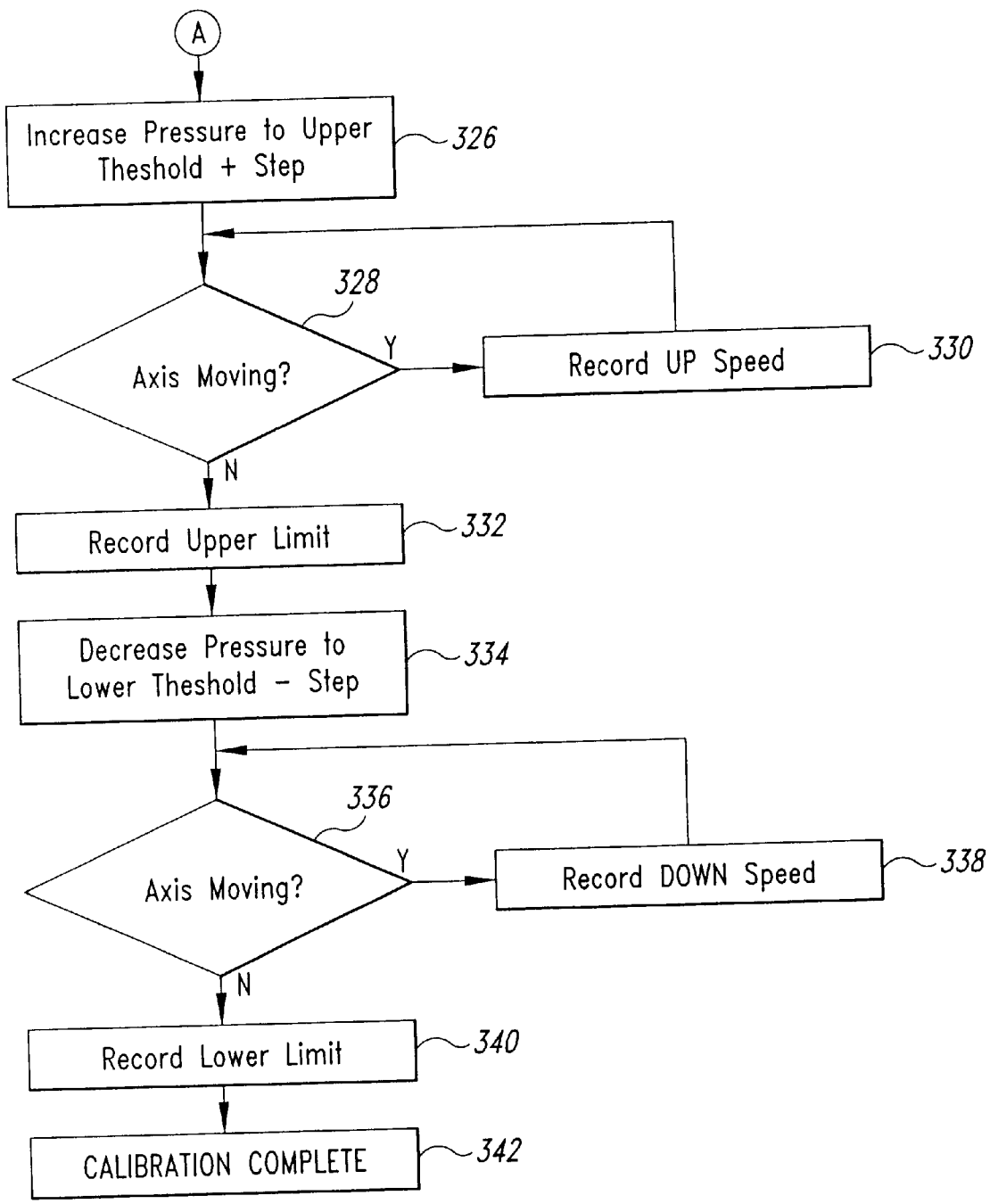

FIG. 8 is a flowchart representation of a calibration routine 300 of the z-axis control system 200 in accordance with an embodiment of the invention. First, the pressure within the air cylinders is set to a default or neutral pressure 302 corresponding to a neutral, non-moving position of the cutting head. Next, the air brake is released 304. After the air brake is released, a determination is made whether the axis is moving up 306. If the axis is moving up, the pressure within the air cylinders is incrementally decreased 308. The determination whether the axis is moving up 306, and the action of decreasing the pressure 308, are repeated until the axis is no longer moving up.

If it is determined that the axis is not moving up 306, a determination is made whether the axis is moving down 310. If z-axis is moving down, the pressure within the air cylinders is incrementally increased 312. The determination 310 and incremental pressure increase 312 are repeated until the axis is no longer moving down.

One may note that acts or actions 306 through 312 may not be necessary to the calibration procedure 300 if the default pressure setting 302 is indeed a neutral pressure setting. If, however, the default pressure setting 302 is not a neutral pressure setting, such as may be the case when, for example, one or more components of the cutting head have been modified or removed since the previous calibration, then the acts or actions 306 through 312 may be followed to establish an appropriate neutral pressure setting.

As shown in FIG. 8, if it is determined that the axis is not moving down, another determination is made whether the axis is moving up 314. If it is determined that the axis is not moving up, the pressure is incrementally increased 316, and the calibration procedure 300 returns to the determination whether the axis is moving up 314. The determination 314 and the incremental pressure increase 316 are repeated until the axis is moving up.

If the axis is moving up 314, an upper threshold pressure is recorded by the z-axis controller 318. The upper threshold pressure signifies the pressure in the air cylinders at which the axis will begin moving upwardly.

Next, a determination is made whether the axis is moving down 320. If it is determined that the axis is not moving down, the pressure is incrementally decreased 322. The calibration procedure 300 then returns to the determination whether the axis is moving down 320. The determination 320 and the incremental pressure decrease 322 are repeated until the axis is moving down.

If the axis is moving down 320, the z-axis controller records a lower threshold pressure 324. The lower threshold pressure signifies the pressure in the air cylinders at which the axis will begin moving downwardly.

Next, the pressure in the air cylinders is increased to the upper threshold pressure plus an incremental step pressure 326. A determination is then made whether the axis is moving 328. If the axis is moving, the speed of the upward movement of the axis is recorded 330. The determination whether the axis is moving 328 and about recording of the speed of upward movement 330 are repeated until the axis is no longer moving, and has reached its upper limit of travel. If the axis is not moving 328, an upper limit of travel is recorded 332.

The calibration procedure 300 then decreases the pressure in the air cylinders to the lower threshold pressure minus the incremental step pressure 334. Next, a determination is made whether the axis is moving 336. If the axis is moving, the speed of the downward movement of the axis is recorded 338. The determination 336 and the recording of the speed of downward movement 338 are repeated until the axis is no longer moving, and has reached its lower limit of travel. If the axis is not moving 336, a lower limit of travel is recorded 340. The calibration procedure 300 is then complete 342.

In the set-height cutting mode, the axis is moved manually or automatically into place. When moved automatically into place, the axis will move down until it engages the surface 14 of the workpiece 12 by lowering until the axis stops moving, then, if necessary, raising up to the proper standoff distance. The z-axis control system 200 then assumes a neutral pressure with the air brake engaged.

In the manual raise/lower mode, the axis is raised or lowered as commanded by the operator until the end of travel limits have been reached, or until the wear ring 129 of the collision shield 127 contacts the surface 14 of the workpiece 12. The axis may be raised or lowered, for example, by inputting a raise or lower movement command into the z-axis controller 190 by means of a keyboard (not shown). When the limits of travel have been reached, all travel ceases. When a movement command is removed, or the end of travel is reached, the axis receives a reverse-pressure signal to slow it down. The reverse-pressure signal may, for example, be based on velocity of the axis. When the axis is moving continuously, the axis seeks a constant velocity. Incremental moves may be based, for example, upon individual keystrokes of the keyboard (or individual mouse clicks, etc.) that movie axis a predetermined distance either up or down. In either the incremental or continuous movement case, the movement is terminated by engaging the air brake.

In the park mode, the axis is simply raised to its upper limit of travel and air brake is engaged. The pressure within the air cylinders is set at a neutral bias setting.

In the biased-following (or height-sensing) cutting mode, the axis has a slight downward bias pressure. The slight downward bias causes the axis to fall slowly, keeping the wear ring 129 in constant contact with the surface 14 of the workpiece 12. Stiction in the up direction is compensated for by rapidly moving the pressure up and down within the dead band between the lower threshold pressure and the upper threshold pressure. The air brake 218 is not engaged.

Figure 9:
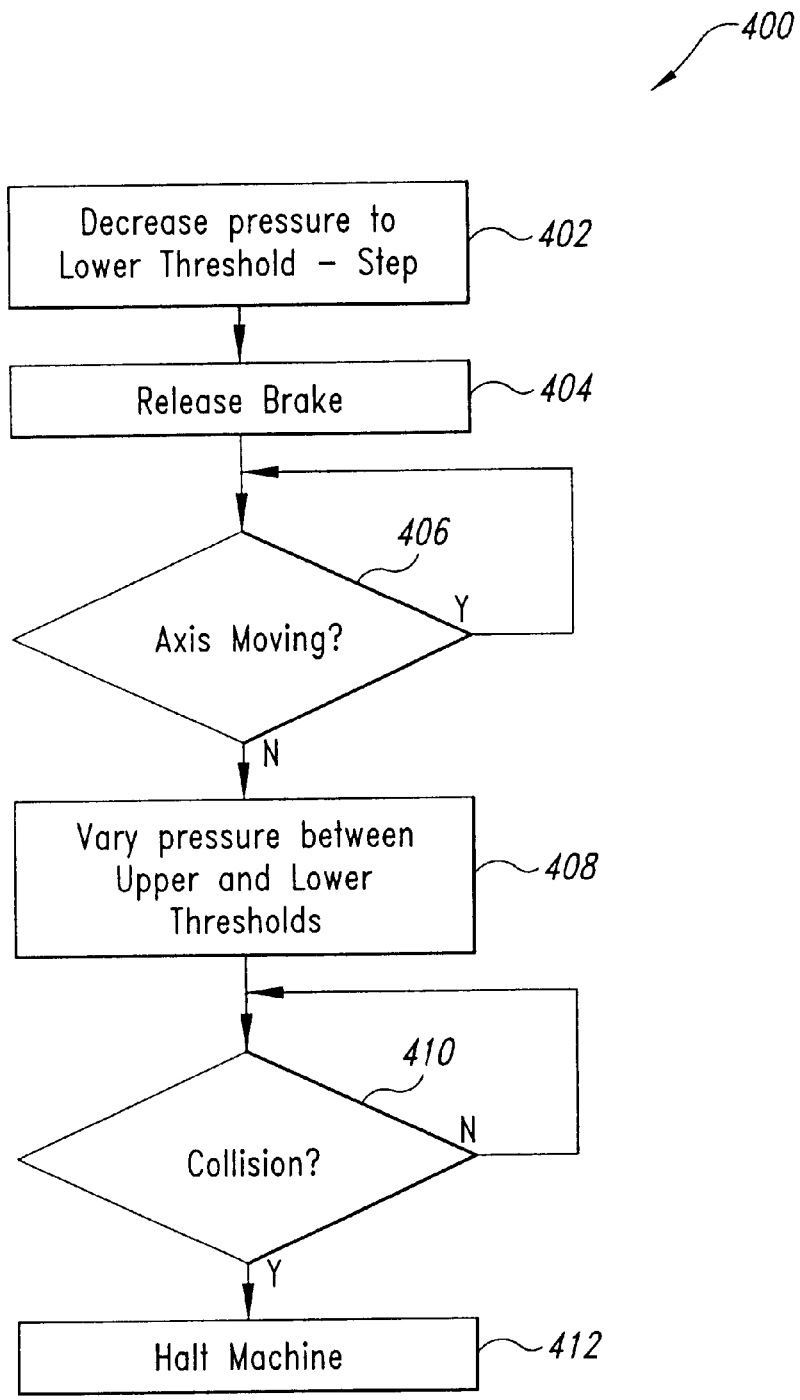
FIG. 9 is a flowchart representation of a biased-following routine of a z-axis control system in accordance with an embodiment of the invention.

FIG. 9 is a flowchart representation of a biased-following (or height-sensing) routine 400 of the z-axis control system 200 in accordance with an embodiment of the invention. In this embodiment, the biased-following routine 400 begins by decreasing the pressure in the air cylinders to the lower threshold pressure minus an incremental step pressure 402. Next, the air brake is released 404. A determination is then made whether the axis is moving 406. If the axis is moving, the determination 406 is repeated indefinitely until the axis is not moving. If the axis is not moving, the pressure in the air cylinders is varied between the upper and lower threshold pressures 408. Next, a determination is made whether a collision has occurred 410. If a collision has not occurred, the collision determination 410 is simply repeated indefinitely. If a collision has occurred, the z-axis control system 200 is halted 412. Alternately, if a collision has occurred, the pressure in the air cylinders may be increased to rapidly raise the axis away from the workpiece.

Another advantage of the z-axis control system 200 is that it automatically compensates for changes in friction and/or weight of system components such as, for example, the air cylinders 208, the linear rail 216, the guide blocks 206, wear parts such as bearings, and other system components. The z-axis controller 230 automatically compensates by adjusting the pressure within the air cylinders 208 to lower the slide member 214, maintaining the engagement of the wear ring 129 with the surface 14 of the workpiece 12 in the biased-following mode of operation, or at a constant height above the surface 14 in the set-height mode of operation. In this way, the standoff distance d is maintained at the desired value despite changes in friction and/or weight of the various system components.

Improved apparatus and methods for z-axis control and collision recovery of cutting heads of waterjet cutting systems have been shown and described. From the foregoing, it will be appreciated that although embodiments of the invention have been described herein for purposes of illustration, various modifications may be made without deviating from the spirit of the invention. Thus, the present invention is not limited to the embodiments described herein, but rather is defined by the claims, which follow.

What is claim is:

1. A method of collision detection and recovery for a cutting head assembly of a waterjet cutting system, comprising:
    disengageably mounting the cutting head assembly on a mounting assembly having a collision-sensing circuit that senses an electrical contact between the cutting head assembly and the mounting assembly;
    monitoring a collision-detection signal status from the collision-sensing circuit;
    colliding the cutting head with a foreign object;
    disengaging the cutting head assembly from the mounting assembly to break the electrical contact and change the collision-detection signal status;
    determining that a collision has occurred from the change in the collision-detection signal status; and
    transmitting a stop signal to the waterjet cutting system.

2. The method according to claim 1, further comprising disengaging the cutting head from the foreign object.

3. The method according to claim 1, further comprising transmitting an actuation signal to a z-axis control system attached to the cutting head.

4. The method according to claim 1, further comprising re-engaging the disengageable mounting assembly.

5. The method according to claim 1 wherein transmitting a stop signal to the waterjet cutting system comprises transmitting a shutoff signal to a high-pressure fluid source of the waterjet cutting system.

6. A method of controlling a height of a cutting head of a waterjet cutting system over a surface of a workpiece, comprising:

rigidly coupling a first end of a substantially rigid contact member to the cutting head;

moving the cutting head toward the workpiece until a second end of the substantially rigid contact member exerts a contact force on the workpiece;

exerting an adjustably controllable support force on the cutting system;

adjusting the support force until the support force is substantially equal in magnitude and substantially opposite in direction to the contact force; and slightly reducing the support force to slightly bias the contact member into engagement with the workpiece.

7. The method according to claim 6 wherein providing an adjustably controllable support force includes adjustably pressurizing an air cylinder coupled to the cutting head.

8. The method according to claim 6 wherein slightly reducing the support force to slightly downwardly bias the contact member includes slightly reducing an air pressure in an air cylinder coupled to the cutting head.

9. The method according to claim 6, further comprising:

monitoring a collision detection signal; and transmitting a control signal in response to the collision detection signal.

10. The method according to claim 9 wherein transmitting a control signal in response to the collision detection signal includes transmitting a stop signal to a control gantry of the waterjet et cutting system.

11. The method according to claim 9 wherein transmitting a control signal in response to the collision detection signal includes transmitting an control signal to an airflow control valve to increase an air pressure in an air cylinder coupled to the cutting head.

12. The method according to claim 6, further comprising cyclically adjusting the adjustable support force without changing the height of the cutting head.

13. The method of claim 4 wherein the collision-detection signal status is the absence of any signal when the cutting head assembly is engaged with the mounting assembly, and wherein the change in the collision-detection signal status is a change to the existence of a signal.

* * * * *

UNITED STATES PATENT AND TRADEMARK OFFICE
CERTIFICATE OF CORRECTION

PATENT NO.      : 6,379,214 B1
DATED           : April 30, 2002
INVENTOR(S)     : Jonathan M. Stewart et al.

It is certified that error appears in the above-identified patent and that said Letters Patent is hereby corrected as shown below:

<u>Column 12,</u>
Line 11, "waterjet et cutting system" should be corrected to read -- waterjet cutting system --.
Line 20, "The method of claim 4" should be corrected to read -- The method of claim 1 --.

Signed and Sealed this

Thirteenth Day of August, 2002

Attest:

Attesting Officer

JAMES E. ROGAN
*Director of the United States Patent and Trademark Office*